March 28, 1961 G. WEBER 2,977,504
AUTOMATIC ELECTRICAL CONTROL DEVICE, PARTICULARLY
FOR MOTOR VEHICLES
Filed Aug. 28, 1953
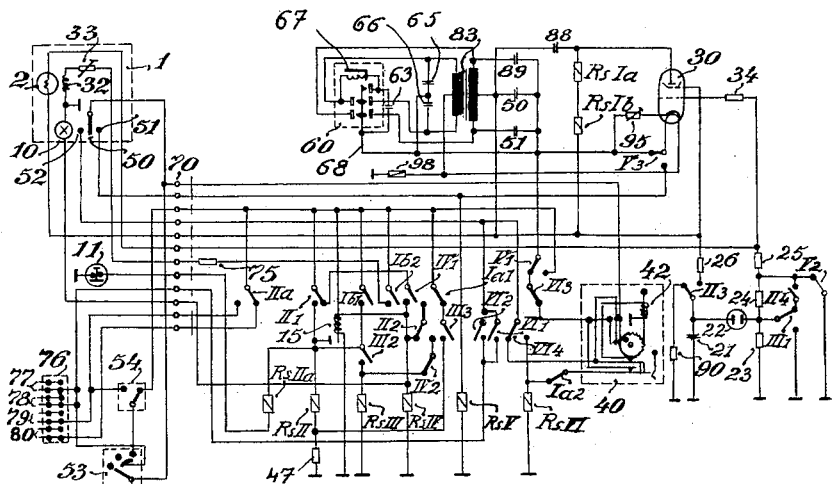
*Fig. 1*
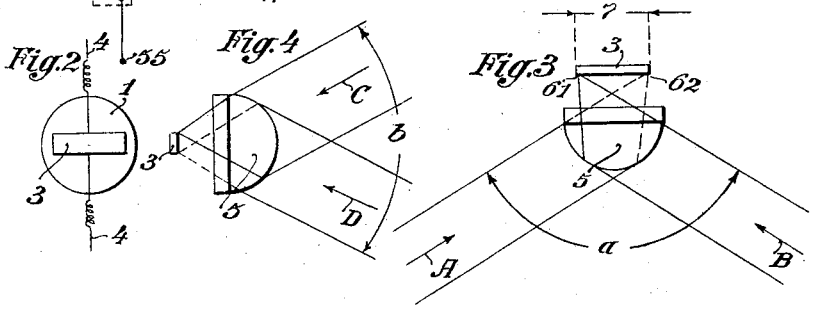
*Fig. 2* *Fig. 4* *Fig. 3*
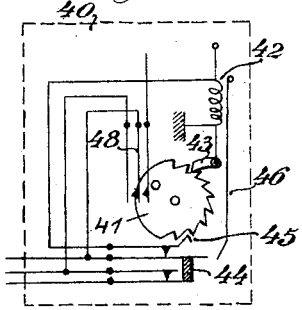
*Fig. 5*
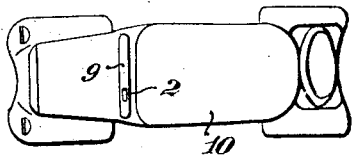
*Fig. 6*
Inventor
GUSTAV WEBER
By
Young, Emery & Thompson
Attys.

United States Patent Office 2,977,504
Patented Mar. 28, 1961

2,977,504

AUTOMATIC ELECTRICAL CONTROL DEVICE, PARTICULARLY FOR MOTOR VEHICLES

Gustav Weber, Schiller Strasse 32, Berlin-Charlottenburg, Germany

Filed Aug. 28, 1953, Ser. No. 377,198

11 Claims. (Cl. 315—83)

The invention refers to an electronically controlled switching apparatus which is actuated by the influence of light upon a photoelectric cell and is adapted for the most varied purposes, such as the control of machines, the testing and supervision of plants, traffic systems, but specifically, however, for operating the sources of light on motor vehicles. In this connection it is primarily an object of the invention which involves the automatic dimming and restoring of the far light and of the automatic switching in of the parking light.

In the case of motor vehicles this automatic mechanism is intended to relieve the driver of all exhausting and wearisome manual switching operations for dimming and restoring the headlights which is of a particular importance on much frequented highways whereby at the same time the driving security and the self-confidence of the driver are established, and above all he is not exposed any longer to the danger of causing accidents arising from the fact that he had failed to dim the headlights. This switching installation also automatically prevents the prohibited driving with glaring headlights in the city and parking during darkness without lighting the lamps.

The drawing represents the invention in a practical example in which;

Fig. 1 is a wiring scheme of the entire installation,

Fig. 2 is a top view of the photoelectric cell as a diagrammatic layout,

Fig. 3 is a plan view of the cell with lens,

Fig. 4 is a side view of the cell according to Fig. 2,

Fig. 5 is a diagrammatic view of the time switch, and

Fig. 6 is a diagrammatic plan view of a motor vehicle having a light sensitive cell provided therein.

The light sensitive device 1 (Fig. 1) with the built-in photoelectric cell 2, is so mounted behind the windshield 9 of the motor vehicle 10 that the headlight of a vehicle coming in the opposite direction falls in an angular range which should be as large as possible, from the front and in a horizontal plane falling upon the light sensitive cell 2. In order to obtain a large angular range, the light sensitive device 1 of the cell of light 3 is made into the shape of a strip (Fig. 2). Over this cell of light 3 the electric current is directed by the conductors 4. The source of light 3 is in its longitudinal direction in a horizontal direction arranged behind an optical lens 5 in such a way that the light rays from the outside and being practically parallel are refracted by the lens and collected at a point 6. Due to the horizontal position of the strip of the cell the point 6 is able to reach through the entire width 7 of the cell horizontally between the two positions 61 and 62 and still excite the photoelectric cell in this entire area. Thus there is a large zone for the effective angle of incidence (*a*) which when a vehicle comes from the opposite side in a slanting direction from the left (direction A) or in slanting direction from the right (direction B), the dimming of the far light results. Even a vehicle coming out of a curve operates the light dimming device in time. In a perpendicular direction, on the other hand, due to the narrowness of the strip only small angular ranges (*b*) (Fig. 4) become effective, so that an undesired operation of the dimming device by moonlight shining from above is impossible. On the other hand, a releasing of the automatic mechanism is assured when the car is driving over the tops of mountains where light comes from below in the direction of the arrow D. Finally, also when driving on lighted streets, the bright light is apt to be dimmed. In order to prevent the driver from being surprised by the unexpected automatic dimming of his far or bright light, the switching mechanism is provided with a warning signal, as for example a small lamp 70 or some other type of signal which may also be a sound device. There is also the possibility that both signals, a sound device and an optical indication, may be operated simultaneously. The warning signal 10 is given only at the moment when the cell of the light 2 becomes operative until the dimming of the bright light. This enables the driver to slow down the speed of his car, so that if surprised by the dimming of the light, he does not need to continue driving at a high speed on a street which is dimly lighted.

Furthermore, an additional switch 11 is provided which enables the driver to drive without the dimming automatic mechanism or to cut out for any desired space of time the automatic dimming mechanism. Thus the driver is in a position, by means of the break switch 11, to give any desired blinking signals to a vehicle coming from an opposite direction and whose lights are not dimmed because it is not equipped with a light-dimming device, as well as to a vehicle he wishes to overtake.

In addition, the switching mechanism is fitted with a device of a so-called slow-down in operation which is actuated by bimetal relays 15. Hereby the difference in the light intensities has been taken into consideration which indicate the headlight intensities of the various vehicles. In the event that such a slow-down in operation is not provided, it may happen that the light of a vehicle fitted with a less powerful lamp is dimmed at a greater distance, before, on account of its lower power headlight, it itself was in a position to dim the lights of the other vehicle. Due to the slow-down in operating the dimming, however, after a certain space of time only, during which the vehicle with the low-power headlight has approached the other at such a distance that also its power of light is sufficient to release the automatic mechanism of the other vehicle, so that automatic dimming takes place practically at the same time for both vehicles. However, since the slow-down in operation would result in a drawback in cases where a vehicle, coming around curves or from an adjacent street, appears all of a sudden and with a bright headlight. In such a case the screening must be performed immediately and without any retardation, and if at all possible, still more rapidly than a driver is able to react in such critical moments due to the effect of the so-called "shock-second." This is accomplished by connecting two relays 18 and 19 in series or in parallel which are tuned to different current intensities. In case of relatively weak light rays upon the photoelectric cell the relay only will operate which controls the slow-down, whereas on an intensive exposure of the photoelectric cell to light, as may happen in the event of the sudden appearance of a vehicle around a curve or from an adjacent street, also the other relay will become effective which switches off the slow-down and accomplishes a dimming instantly.

In normal cases where dimming takes place at a great distance, it is also of importance to prevent a too early switching on of the bright lights, i.e. the switching on again of the far or bright light, that is to say to provide a slow-down for the return of the bright light. A too early flashing will occur specifically in a case where the vehicle coming from the opposite direction and having dimmed lights, has such weak lights in the dimmed condition that this is not sufficient to maintain a state of dimming on the vehicle. In such a case the automatic mechanism would again operate too early. Due to the retardation such an early flashing is prevented.

Furthermore, it is advisable to also provide a so-called impulse scanning mechanism which comes additionally into operation, once the slow-down in dimming has ceased to function. This mechanism comprises a condenser 21, a discharge tube 22, and the requisite resistances 23–25. Due to this scanning, the operating sensitivity of the photoelectric cell 2 is increased or lessened at certain intervals of time, specifically every two seconds, by disconnecting or additionally connecting resistances which for a certain time intensifies or lessens the electric voltage on the photoelectric cell 2 or/and on the amplifying tube. In such cases where due to the sudden appearance of a strong source of light, as on a curve, the dimming is not retarded automatically, switching means ensure that also the bright lighting is not delayed.

As is well known, photoelectric cells show a certain sluggishness which may become troublesome under certain circumstances. Photoelectric semi-conductors, so-called photoresistances of the type of incomplete phosphorus, such as cadmium and indium-sulphide cells, have under certain short-wave visible range, a negative photoelectric sensitiveness in ordinary light, but when subjected to ultra-red light, a positive sensitiveness is present resulting in an increase in resistance. These properties are used in the present invention in order to influence the automatic restoration of the bright light from the viewpoint of time. To this end the photoelectric cell 2 is provided with an ultra-red radiator 32, the radiation of which may operate on the photoelectric cell and whose intensity of radiation may be influenced by a regulating resistance 33. As in the case of an intensive floodlight coming from a short distance, a retardation-free drop will necessarily occur, so that care has been taken that at the same time as the automatic dimming takes place, also the ultra-red radiator is operated which results in the darkness-resistance of the cell increasing and hereby the immediate and retardation-free re-flashing is rendered possible, once the floodlighting caused by the vehicle coming from the opposite direction. According to the intensity of the ultra-red radiation the automatic bright lighting will take place sooner or later.

When two vehicles having their headlights dimmed, are driving past one another, as every one knows, the contrast effect dreaded by the driver will occur, the vehicles driving out of the influence of the bright light all of a sudden into complete darkness. In this way a so-called "dark hole" is produced, the driver being in complete darkness which makes driving difficult. In order to correct this disadvantage, according to the invention, the ultra-red radiator 32 is adjusted to so intensive a radiation with the aid of the regulating resistance 33 that automatic bright return of the headlights takes place already at the moment when the vehicles are driving past one another, and this at a distance of 3 or 5 meters. A return to the bright lights at so short a distance does not produce a dazzling effect on the vehicle coming from the opposite direction, but, on the other hand, eliminates the dreaded "dark hole."

As to motor vehicles which are equipped with polarized light, means have been provided, as for example by mounting polarization filters of a stationary, adjustable or rotary type, which are able to alter the light in its physical condition in such a way that the photoelectric cell can also operate on this source of light.

To be able to automatically switch on the parking light after the motor car has been parked, a special time switch has been provided which in order to relieve the battery, puts the switching mechanism into operation only at intervals. For the purpose of the automatic switching of the parking light, the photoelectric cell 2 and/or the grid circuit resistances of the tube 3 are tuned to another degree of brightness than is the case when performing a dimming. As long as sufficiently intense light is acting on the photoelectric cell during the impulse scanning, the town light of the vehicle will not be switched on and this will be the case only, when the light has dropped below a certain degree of luminosity.

According to Fig. 5 the time switch 40 for the periodic testing of the light intensity comprises a ratchet wheel 41 which is turned each time by one tooth by means of the bimetal switch 42 and a control lever 43. Due to this rotation the spring set 44 is raised by the height of one tooth and with the aid of the contact spring 45, engaging the teeth. By bending out the bimetal switch 42 the lock spring 46 is released which introduces itself under the influence of the spring 44 retaining it in the raised position. Once the ratchet wheel 41 is rotated by one tooth, the contact spring 45 catches in and the contacts of the spring 44 will remain open. Thus the bimetal switch 42 being without current is thus cooled, so that it goes back into its initial position. Hereby the lock spring 45 is pressed back and the spring 44 again closes the contacts, so that the new cycle of operations may start. The ratchet wheel 41 in its final position shuts the spring 48 so that in this way the circuit elements arranged behind the photoelectric cell are actuated.

In the following is a detailed explanation of the mode of operation of the connections of Fig. 1. It is to be noted that in the designation of the single relays Roman numerals, and if necessary, small Latin letters have been disposed behind them. Thus the respective switches which are likewise provided with Roman numerals and Latin letters, are mechanically coupled with the corresponding relays so that, when operating the respective relays, the particular switch is operated accordingly. In the drawing all relays are shown in open position.

When for instance the relay RsIa is switched on, the switches Ia1 and Ia2 are simultaneously operated. The extended representation has been given only for reasons of clearness from the view-point of the switching technique.

In order to change the switching connections into the condition of automatic dimming, the main switch 50 is turned to the contact 51. This results in a pulling up of the relay RsV. Now the ignition switch 53 is actuated and the foot switch 54 switched to connect the far light 80. Thus the automatic dimming mechanism is ready for operation. The current flows through the ignition switch 53 and the foot switch 54 to the contact V1 so that the vibrator 60 starts. The contact V3 is connected to heat the valve 30 so that finally the switch V2 is opened.

The vibrator 60 comprises the electro magnet 67 and the contact stud (armature) 68 with its breaker contacts. The vibrator with its spark quenching condensers 65, 66 and 63 cooperates with the transformer 83, the spark quenching condensers 51 and 89, the condenser 50 and the protective condenser 88 and thus serves as a current supplying element to produce the anode voltage for the tube 30. The vibrator 60 is energized by the vehicle battery 55 and transforms the D.C. current into A.C. current produced by the transformer 83.

When the photocell is energized from a long distance by a vehicle coming from the opposite direction, the photocell controls the tube 30 so that the relay Rs and Ia operates. As this relay is more sensitive than the relay Rs and Ib, the latter remains in set position. The contact Ia2 opens and switches off the time switch 40. The switch Ia1 changes over and makes the signal lamp 10 flash. Simultaneously the relay RsIV operates. The switch IV1 holds the relay RsIV and operates the bimetal relay 15. The switch IV2 opens but the relay RsIII remains without any current.

The contact of the bimetal relay 15 now closes and induces the relay RsII to operate. The switch II1 holds the relay RsII and induces the switch relay RsIIa to operate, whereby this relay dims the far light by way of the switch IIa and switches on the near light. By throwing the switches II1 and II2, the relay RsIV is turned off, which energizes the signal lamp 10 and the bimetal relay 15 becomes inoperative. The switches II3 and II4 start the electric control, that is the scanning and this is accomplished by means of the resistance 26, the condenser 21, and the discharge tube 22. Thereby the relay RsIa is released. The switch IV2 goes back into the non-operative position and prepares the relay RsIII for operation by means of the switches II2 to IV2. The relay RsIa is again in position to operate by the discharge of the condenser 21 by means of the glow discharge tube 22. The switch Ia1 is now actuated and places the switches II2 and IV2 and the relay RsIII in operation which holds itself by way of the switch III2. By changing over the switch III1 the sensitiveness of the cell 2 is again increased. With the periodic discharges of the condenser 21 by the discharge tube 22, in addition to the increase of the sensitiveness, the ultra-red radiator 32 is also operated, in order to so influence the sluggishness in the drop of the cell 2. The radiation intensity of the ultra-red radiator 32 is adjusted by the regulating resistance 33. The tube 30 is controlled by the periodic discharges of the condenser 21 by means of the discharge tube 22. An increased current impulse takes place which switches in the relay RsIb and switches in the ultra-red radiator 32 by means of the switch Ib2.

When during the periodic scanning no light falls upon the cell 2, the latter breaks the circuit so that all relays will be inoperative. The contacts return to their initial positions so that the far light is turned on again.

If during an existing automatic dimming an interruption shall take place, or blinking signals shall be given to the vehicle coming from an opposite direction or to a vehicle which is to be over-taken, the blinking switch 11 is actuated.

The resistance 47 serves as a protective resistance to the relay RsII. The grid leak resistance 34 serves to equalize too high grid currents, and together with the cell 2 is adapted to a certain sensitiveness which must be released by the light. The resistances 24 and 25 serve to periodically increase and decrease respectively the sensitivity, that is for scanning with the periodic discharges of the condenser 21 by way of the discharge tube 22. The resistance 26 serves as a protective resistance to the screen grid of the tube 30. The resistances 23 and 90 are leak resistances. The cathode resistance 95 is adjustable and serves to regulate the sensitiveness of the cell 2 for the purpose of adjusting the photosensitivity which is operative by a remote or a near distance light source for dimming. The resistance 75 serves as a protective resistance to the ultra-red radiator 32 in order to prevent it from becoming incandescent. The safety fuse 98 guards the entire group of elements against overload caused by too high currents and voltages.

When floodlighting, from a very short distance, is occasioned by a vehicle coming all of a sudden out of a curve or an adjacent street from an opposite direction, a high flow of current is produced through the cell 2 owing to the intense luminous radiation from a near proximity, and this flow of current goes to the tube 30. Thereby the relay RsIb is switched in. The relays RsII and RsIIa are switched in at once by way of the switch Ib1 whereby the far light is dimmed immediately without the control lamp 10 lighting up. Likewise, the ultra-red radiator 32 is also switched in at once by way of the switch Ib2, and it guarantees an immediate relighting at the moment after passage of the other vehicle.

For the purpose of the automatic switching in of the parking light, the switch 50 is manually connected to the contact 52. The ignition switch 53 is thus switched off, thereby the flow of current passes from the battery 55 to the time switch 40 by way of the switches 50 and VI4. The bimetal switch 42 becomes warm and rotates the ratchet wheel 41 farther by one tooth. The contact spring engaging with the teeth of the ratchet wheel is raised when turning the ratchet wheel and retained by a lock spring. This results in an interruption of the flow of current and the bimetal switch 42, having become de-energized returns to the initial position. The lock spring is pressed back by the bimetal switch 42 and the contact is closed again. Hereby this method is repeated. As soon as a trip cam located on the ratchet wheel closes the spring set 48, the flow of current takes place from the battery connecting terminal 70 over the spring and from the time switch 40 by way of the switches VI3 and V1 to the vibrator 60. In daylight, that is, a lighting of over 0.6 lux, the relay RsIa operates and opens the switch Ia2. Hereby the relay RsVI cannot operate and the parking light is not switched on. The time limit switch 40 continues working as described, until dusk which is at a luminous intensity of 0.6 lux and less. As soon as dusk begins, the current flowing through the cell 2 diminishes so that the anode current remains below the minimum operating value of the relay RsIa. In this way the relay RsVI is energized by means of the switch Ia2, the relay RsVI being above the switch VI4. The current flowing to the vibrator 60 is interrupted by opening the switch VI3, and thus the time switch 40 and the group of switching elements is arrested except the relay RsVI. The switches VI1 and VI2 close the circuit flowing to the parking light and the back light.

The back light remains switched in as long as the change-over switch 50 is switched out. The time switch 40 continues running a certain space of time, i.e. until the moment when the trip cam of the ratchet wheel ceases to close the spring set. Then also the time limit switch 40 is de-energized.

Having described my invention, I claim:

1. A light sensitive control system for automatically dimming the headlamps of a motor vehicle or for automatically controlling the energization of a parking light on the vehicle selectively, comprising an electric circuit, a light responsive device in the circuit operable to dim the headlamps in response to light received from the headlamps of an approaching vehicle, a selective switch for connecting either said headlamps or said parking light into said circuit to be controlled by said light responsive device, said light responsive device being operable to control the energization of said parking light in response to ambient illumination when said selective switch is in the position which connects the parking light in the circuit.

2. A light sensitive control system according to claim 1, in which a warning signal is provided in the circuit to notify the driver prior to the operation of the automatic dimming device.

3. A light sensitive control system according to claim 1, in which means are provided in the circuit to restore the far light by retardation of at least 5 seconds after the vehicle in the opposite direction has passed.

4. A light sensitive control system according to claim 1, in which means are provided to adjust the photoelectric cell as to sensitivity relative to a certain light intensity including a regulable resistance and a regulable cathode resistance with a grid leak resistance.

5. A light sensitive control system according to claim 1, in which means are provided in the circuit so that if several vehicles are following one another driving in the direction opposite to that of the respective vehicle, the automatic dimming is not interrupted until the last vehicle has passed.

6. A light sensitive control system according to claim 1, in which an optical lens is provided in front of the photoelectric cell to increase the angle of incidence of the point of light coming from the opposite direction relative to the travel of the vehicle.

7. A light sensitive control system according to claim 1, in which means are provided to change the sensitivity of the circuit to be operative for a different intensity of the light rays.

8. A light sensitive control system according to claim 1, in which a source of ultra-red light is provided in the circuit for the photoelectric cell.

9. A light sensitive control system according to claim 1, in which a time limit switch is provided in the circuit to switch in the parts effective for energizing the parking light.

10. A light sensitive control system according to claim 1, in which a switch is provided operative automatically to switch in parking light on approach of darkness and automatically switch off the parking light at dawn.

11. A light sensitive control system according to claim 1, in which a bimetal strip is provided in the circuit which is heated by an electric current and is provided with rods and a toothed wheel whereby the toothed wheel is rotated step-by-step and a contact is actuated by the rotary movement, so that after rotating the wheel by at least one tooth space the heating of the strip is disconnected from the power source so that the bimetal strip cools and bends back and thereby engages in one of the next teeth located farther back whereby the heating current contact is closed again and the toothed wheel is turned one step farther.

References Cited in the file of this patent

UNITED STATES PATENTS

| | | |
|---|---|---|
| 2,039,230 | Lamb | Apr. 28, 1936 |
| 2,423,278 | Willis | July 1, 1947 |
| 2,571,981 | Wensel | Oct. 16, 1951 |
| 2,598,420 | Onksen | May 27, 1952 |
| 2,614,227 | Bordewieck et al. | Oct. 14, 1952 |
| 2,615,079 | Pardue et al. | Oct. 21, 1952 |